Patented May 8, 1951

2,551,580

UNITED STATES PATENT OFFICE 2,551,580

ACID-TREATED CLAY CATALYST FOR CRACKING HYDROCARBONS

George R. Bond, Jr., Paulsboro, N. J., assignor to Houdry Process Corporation, Wilmington, Del., a corporation of Delaware No Drawing. Application March 27, 1947, Serial No. 737,719

6 Claims. (Cl. 196—52)

The present invention relates to the preparation from clays of improved contact masses useful as cracking catalysts, as well as to improvements in hydrocarbon conversion processes employing these catalysts.

Catalytic contact masses chiefly employed in commercial operations for cracking of hydrocarbons for the production of gasoline and other liquid conversion products of lower molecular weight than the starting materials, as well as in catalytic treatment for the improvement of gasoline and naphthas, generally comprise synthetic gels of silica and alumina or certain acid-activated clays having substantial cracking activity.

The clays coming into consideration for use as starting materials in the preparation of these acid-activated materials of high cracking efficiency are those falling within the designated class of acid-activatable montmorillonites and constituted by the non-swelling bentonites or the so called sub-bentonites.

The value of a contact mass in catalytic cracking of hydrocarbon materials depends to a large extent upon its selectivity in producing from a charge stock high or acceptable yields of desired liquid products such as motor fuels with relatively low production of by-product gas and coke, particularly the latter. Although gaseous by-products can be usefully employed as charge to polymerization, alkylation or other processes, it is nevertheless generally preferable to employ catalysts having an inherent tendency to produce high ratios of normally liquid to gaseous products, since even with such catalysts, higher yields of gaseous products can be obtained, if desired, by the control of the severity of cracking conditions. The coky deposit formed in a cracking operation, however, represents loss of charge to products that are not essentially recoverable, and the reduction of the quantity of this product even as to small changes in ratio of coke produced to gasoline yield are highly significant in the consideration of the economics of commercial operation. Although the acid-activated clays of good cracking activity can be more cheaply produced than the synthetic catalysts, the initial difference in cost may be largely compensated by other advantages portrayed by the synthetic catalysts; notably: higher ratios of gasoline formed to coke deposited; superior stability particularly in use with stocks causing abnormal loss of catalytic activity; and better quality, as measured by performance characteristics, of the motor fuel produced.

I have found that cracking catalysts displaying typical performance characteristics of synthetic silica-alumina gels can be prepared with economic advantages from raw or partially spent acid-activatable montmorillonite clays. The novel catalysts according to the invention are prepared by severe acid treatment of the clay to effect removal of a major part of impurities and undesired components, such as iron compounds, resulting in a residual structure composed chiefly of silica and containing only a small part of the original aluminum component; and by the deposition of alumina within the thus obtained residue. The clay subjected to the acid-treatment may be in the form of discrete particles, granules, or regularly shaped masses such as pellets, and the conditions of acid-treatment are advantageously selected to substantially maintain the individual structure of the clay pieces without slaking or complete disintegration.

In accordance with the invention, the acid treatment is carried out with selection of conditions as to acid concentration, contact time, temperature, and quantity of acid, to effect the required degree of extraction, as indicated by the quantity of alumina remaining in the residual clay. In accordance with a preferred embodiment, the acid treatment is conducted under conditions to obtain a residual clay structure comprising less than 5% by weight of alumina and at least 80% by weight of silica (on a volatile free basis); the other ingredients present in minor amount being chiefly composed of oxides and/or complexes of calcium and magnesium, and a small portion of the unremoved iron components.

The clays useful as starting materials for the production of the catalysts of the invention are the acid activatable montmorillonites designated in the art as sub-bentonites, being the type of clays which have been extensively employed in the commercial production of acid-activated contact masses used as decolorizing agents for lubricating oils and as hydrocarbon cracking catalysts; an acid-activated product of this type is that sold under the brand name, Super "Filtrol."
The native clays employed for acid activation do not vary widely in composition; typical analyses being represented by the following, on a volatile free basis:

|  | I | II |
|---|---|---|
|  | Parts by Weight | Parts by Weight |
| $SiO_2$ | 67.3 | 67.8 |
| $Al_2O_3$ | 19.5 | 19.1 |
| $Fe_2O_3$ | 1.8 | 2.4 |
| CaO | 3.2 | 3.7 |
| MgO | 6.9 | 7.0 |
| $TiO_2$ |  | 0.3 |
| MnO | 0.8 |  |
| $Na_2O$ | 0.2 |  |
| $SO_3$ |  | Trace |

By conventional acid activation, products are obtained having typically about 72–74% $SiO_2$ and about 17–18% $Al_2O_3$, the silica to alumina ratio being in the order of about 4/1 and less than 5/1. As distinguished from the contact masses obtained by conventional acid activation, the improved catalysts of the present invention are prepared from these clays acid treated to such an extent that the residues may obtain a weight ratio of silica to alumina in excess of 40/1, and contain on a volatile free basis less than 5% by weight and preferably 1 to 3% of alumina, and less than 0.8% iron calculated as $Fe_2O_3$.

The raw sub-bentonite clay, which may constitute a source material for preparation of the novel catalysts of the invention, finds no practical use as a cracking catalyst, because of the relatively small quantity of gasoline present in the products obtained in cracking liquid hydrocarbons of higher boiling point. By acid-treatment of the raw clay, the gasoline producing characteristics are considerably enhanced. With increase in extent or severity of the acid-treatment, catalysts of progressively higher gasoline yield activity are obtained until a point or region is reached at which there is no further increase in gasoline yield activity, and beyond that point or region of optimum or maximum activity, the gasoline producing tendencies of the clay catalyst decline on further or more severe acid-treatment. Clay catalysts of acceptable high activity chiefly in commercial use are those prepared by acid treatment to approximately the maximum gasoline producing activity possible by such treatment.

In preparing the catalysts of the invention, acid treatment is carried out to a considerable extent beyond the point or region resulting in catalysts of maximum gasoline yield. By re-impregnation of the obtained residue with alumina in hereinafter designated amounts, the resulting mass takes on certain important characteristics of synthetically prepared silica-alumina catalysts, evidenced principally by comparatively high gasoline to coke ratios at economically efficient catalytic activity levels.

Instead of starting with a raw sub-bentonite clay, the improved catalysts of the invention may be prepared by further acid treatment of an unused commercial acid-activated clay or one which has become partially spent or deactivated in use as a decolorizing agent or as hydrocarbon conversion catalyst. A large part of such clays being already calcined incident to their initial preparation or use are in advantageous condition for the required acid treatment, whereby large quantities of iron and alumina and accompanying impurities can be readily extracted without disintegration of the pieces or particles of clay subjected to the acid treatment.

Since the plasticity of a raw clay may be impaired, at least to some extent, by severe acid treatment, it is preferred even when starting with raw clay, to carry out the acid treatment in several steps. Thus, the raw clay, as mined or after washing to remove adhering sand and other loose foreign materials, may be ground and treated with mineral acid under conditions similar to those employed in preparing conventional acid-activated decolorizing clays, as described for instance in U. S. Patents 1,397,113, 1,642,371, 1,776,990 and later patents. For instance, a typical treatment may involve the use of dilute sulfuric acid of about 20 to 30% concentration in water slurried with dried or wet clay, employing in the order of .20 to .40 part by weight of acid (100% basis) per part by weight of calcined clay. Employing temperatures in the range of about 180° F. to the boiling point of the acid mixture, extraction should be continued for 4 to 8 hours, after which the clay is washed and dried. The acid-activated clay may then be made up into granules or lumps or extruded to form masses of desired sizes and shapes, the structure being fixed by further drying and calcining. The preparation of contact materials useful as catalysts from such acid-activated clays is described in the Houdry patent U. S. 2,078,945. Since it is proposed to subject the acid-activated clay thus prepared to further acid treatment in accordance with the present invention, it will be seen that the extent of the initial acid treatment is not limited to that utilized in commercial acid-activation; the acid treatment may accordingly be carried out to a lesser or greater extent, but desirably not to an extent to interfere with ready molding or extrusion.

The calcined acid-treated clay mass obtained as above described may then be subjected to further acid treatment designed to extract a major part of the remaining aluminum content, and the operating conditions may be selected as desired, so long as by the combination of selected conditions a clay residue having the indicated desired composition is obtained. If the previous acid treatment was carried out to an extent resulting in approximately maximum activity for catalyst use, the second acid treatment may be carried out with a mineral acid such as hydrochloric or sulfuric, under the same or different conditions than before, the time of treatment being controlled to effect the desired extraction. In this instance employing sulfuric acid of 25% strength in an amount (100% weight basis) equal to about .40 parts acid to 100 parts clay at 200 to 210° F., digestion over a period of 36 to 48 hours will result in a residual product having about 1.5 to 2% alumina by weight (volatile free basis).

The final acid treated clay, already in the form of finely divided particles or ground to such form, may if desired, be made up into pellets or other regular shaped bodies by extrusion or otherwise molding with the adjustment of water content to proper consistency, and with or without addition of lubricants or other extrusion aids. These shaped bodies may then, preferably after fixing the structure by calcination, be employed for impregnation with alumina.

The alumina may be deposited in the finely divided clay or in larger pieces or in the shaped bodies of the clay, by reacting a soluble aluminum salt with an alkaline material such as ammonium hydroxide in the presence of the clay, to form the hydrate or hydrous oxide of aluminum, convertible to alumina by drying. The impregnated clay is then dried and if desired also calcined or the latter step may be deferred and calcination effected by high temperature in use. The amount of alumina deposited may comprise 1 to 10% of the dry clay weight preferably about 5%, or an amount sufficient to bring the total alumina content, present in the residue and added, to no more than about 15%.

The improved catalysts thus prepared obtain considerably better gasoline to coke ratios than catalysts prepared by mere acid-activation of the clay. Further, because of the reduction in iron content and that of other fluxing constituents and impurities by the severe acid treatment, the alumina impregnated clays have an expected longer useful life and should be capable of better withstanding the deteriorating influences of corrosive charge stocks causing abnormal or accelerated aging of ordinary acid-activated clay catalysts.

*Example*

(a) 140 parts by weight of dry commercial acid-activated clay were digested in a mixture comprising by weight 168 parts of distilled water and 56 parts concentrated sulfuric acid (C. P. 95% acid), giving an acid strength of about 25% and an amount of acid equal to about .40 part by weight of the clay. The slurry was agitated at about 205° F. for approximately 3 hours and then let stand over night (16 hours) at about 200° F. The hot suspension was again agitated and let stand for a total of 4 days at a temperature of about 170° F. The slurry was then diluted by admixture of 60 parts of water and filtered, the obtained filter cake being broken up and washed several times with hot water, until the wash water gave only a slight precipitate with $NH_4OH$, at which time the final filter cake was dried and extruded to strands which were cut into pellets.

The analyses of the commercial acid-activated clay subjected to the acid treatment and that of the residual product are shown in the following tabulation:

| | Original Commercial Acid-Activated Clay | Removed by Acid Treatment Alone | Residue by Difference | Corrected to 100% Volatile-Free Basis |
|---|---|---|---|---|
| | Parts by Weight | Parts by Weight | Parts by Weight | Per cent |
| $SiO_2$ | 54.35 | 0.08 | 54.27 | 90.8 |
| $Al_2O_3$ | 13.25 | 12.3 | 0.95 | 1.59 |
| $Fe_2O_3$ | 1.25 | 0.81 | 0.44 | 0.73 |
| CaO | 1.95 | 0.49 | 1.46 | 2.44 |
| MgO | 3.0 | 0.32 | 2.68 | 4.50 |
| Ign. loss | 24.0 | | 24.0 | |

(b) A portion of the pellets prepared under (a) above after calcination was impregnated with alumina in the following manner: 40 parts by weight of the clay pellets were treated with an aluminum sulfate solution prepared by dissolving in water 12 parts of granulated aluminum sulfate to form a nearly saturated solution at room temperature (the solution contained the equivalent of 2.1 parts by weight of $Al_2O_3$). The solution was poured over the pelleted clay and thoroughly mixed therewith, the pellets being then removed and exposed to the air to evaporate the surface moisture, after which they were subjected in a closed treating vessel to the action of ammonia gas obtained by warming of ammonium hydroxide. There was evidence of an exothermic reaction taking place. After the reaction was completed, the pellets were repeatedly washed to remove soluble ammonium sulfate and any aluminum hydroxide present on the surface. The pellets were then drained and dried. The amount of alumina deposited, calculated from the gain in weight, was found to be 4.75%.

The above prepared alumina-impregnated pellets were employed in cracking of a gas oil under the conditions shown in the table; the yields given are for a typical one-pass operation. Other clay catalysts are included in the table for comparison:

*Table*

Charge: Oklahoma City gas oil.
A. P. I. grav. 36.6:
  Engler Distillation
  470° F. initial
  575° F. 50%
  635° F. 90%
  676° F. E. P.
Fixed bed case operating conditions:
  Rate: 16 vols. chge/20 vol. cat.
  Time: 45 minutes on stream
  Steam: 5% wt. charge
  Pressure: 30 p. s. i. gauge
  Temperature: as shown

| | Catalyst | Average Temperature | Syn. Crude Per Cent Vol. Feed | Gasoline (410° F.) Per Cent Vol. Feed | Coke Per Cent Wt. Feed | Gas Per Cent Wt. Feed | Gas Grav. |
|---|---|---|---|---|---|---|---|
| | | °F. | | | | | |
| A | Alumina impregnated, Example I (b) | 840 | 92.3 | 41.0 | 3.1 | 7.96 | 1.34 |
| | | 840 | 94.6 | 40.6 | 2.8 | 7.5 | 1.35 |
| | | 850 | 93.8 | 40.4 | 2.3 | 7.32 | 1.27 |
| B | Comm. acid-activ. clays | 840 | ---- | 46.5 | 4.88 | 7.14 | 1.24 |
| | | 840 | ---- | 46.5 | 4.2 | 7.8 | 1.27 |
| C | Over-acid treated clay, Example I (a) | 840 | 99.0 | 32.4 | 1.27 | 3.6 | 1.17 |
| | | 850 | 96.5 | 33.6 | 1.7 | 4.63 | 1.19 |

As shown under (B) of the above table, the same clay acid-treated to about maximum gasoline yield activity, employed under similar conditions for cracking the same charge stock, even after stabilization of activity by use in a number of runs, still laid down a considerably greater quantity of coke than the alumina-impregnated catalyst, with only a slight difference in gasoline yields. The total quantity of gas produced was not substantially different, but was generally composed of a greater amount of low density less valuable components such as hydrogen and lighter hydrocarbons, as evidenced by the lower specific gravity of the gas.

Obviously many modifications and variations of the invention as hereinbefore set forth may be made without departing from the spirit and scope thereof and therefore only such limitations should be imposed as are indicated in the appended claims.

I claim as my invention:

1. The method of producing from clay, catalysts having low coke-producing properties in cracking of petroleum hydrocarbons, which method comprises treating with mineral acid an acid activatable sub-bentonite montmorillonite clay to a controlled extent beyond that necessary to develop maximum gasoline producing characteristics for petroleum cracking, and sufficient to form an acid activated clay obtaining lower gasoline production in cracking of petroleum hydrocarbons than said maximum, said acid treatment being carried out in several distinct stages of treatment with fresh acid and to an extent resulting in the provision of a catalytically active clay residue comprising 1 to 5% by weight of alumina and less than 0.8% iron calculated as $Fe_2O_3$ on a volatile free clay basis, and impregnating said clay residue with hydrous alumina, whereby the impregnated clay residue has a lesser tendency to produce coke in petroleum cracking than the same clay acid activated to only maximum gasoline producing capacity.

2. The method which comprises treating with mineral acid an acid activated sub-bentonite montmorillonite clay to an extent sufficient to provide a catalytically active clay residue containing on a volatile-free basis at least 1% $Al_2O_3$ by weight and having a silica/alumina ratio greater than 40/1, and impregnating the obtained clay residue in pellet form with alumina.

3. The process of claim 2 in which said acid treatment is carried out to an extent sufficient to provide a clay residue having 1 to 5% alumina and less than 0.8% iron calculated as $Fe_2O_3$ on a volatile free basis.

4. The process of claim 3 in which said clay residue is impregnated with alumina to about 5% of the dry weight of said residue.

5. The process of converting higher boiling hydrocarbons to products in gasoline boiling range which comprises subjecting said higher boiling hydrocarbon to conversion under catalytic cracking conditions with a pelleted catalyst composed of an acid activated sub-bentonite montmorillonite clay residue comprising about 1 to 3% alumina and impregnated to about 5% of its dry weight with alumina, said catalyst being prepared by the process of claim 1.

6. The method of catalyst preparation which comprises acid treating a sub-bentonite montmorillonite clay by several distinct acid treating steps with fresh acid and to an extent sufficient to reduce its alumina content to about 1–3% of the clay weight on a volatile free basis, thereby providing an acid-activated clay residue of reduced coking qualities, washing and drying said residue, pelleting the dried residue, calcining the obtained pellets, soaking the calcined pellets with an aqueous solution of an aluminum salt in quantity sufficient to deposit about 5% by weight alumina in said pellets and then exposing the soaked pellets to the action of ammonia to effect deposition of hydrous alumina therein, then washing and drying the pellets.

GEORGE R. BOND, Jr.

REFERENCES CITED

The following references are of record in the file of this patent:

UNITED STATES PATENTS

| Number | Name | Date |
|---|---|---|
| 1,837,971 | Joseph | Dec. 22, 1931 |
| 1,838,621 | Haseman | Dec. 29, 1931 |
| 1,939,647 | Arnold et al. | Dec. 19, 1933 |
| 2,203,850 | Tropsch | June 11, 1940 |
| 2,307,795 | Kearby | Jan. 12, 1943 |
| 2,320,799 | Ruthruff | June 1, 1943 |
| 2,323,728 | Ruthruff | July 6, 1943 |
| 2,387,309 | Sweeney | Oct. 23, 1945 |
| 2,397,505 | Richardson | Apr. 2, 1946 |
| 2,400,020 | Pierce et al. | May 7, 1946 |
| 2,403,753 | Pierce et al. | July 9, 1946 |
| 2,408,207 | Garrison et al. | Sept. 24, 1946 |
| 2,410,436 | Ewing | Nov. 5, 1946 |
| 2,431,206 | Spicer et al. | Nov. 18, 1947 |